United States Patent
Seto et al.

[11] Patent Number: 5,951,310
[45] Date of Patent: Sep. 14, 1999

[54] ELECTRONIC APPARATUS HAVING CARD STORAGE PORTION

[75] Inventors: Masaru Seto; Atsushi Tatemichi, both of Tokyo, Japan

[73] Assignee: Kabushiki Kaisha Toshiba, Kawasaki, Japan

[21] Appl. No.: 09/071,538

[22] Filed: May 4, 1998

[30] Foreign Application Priority Data

May 7, 1997 [JP] Japan ..................................... 9-116866

[51] Int. Cl.⁶ .................................................. H01R 13/44
[52] U.S. Cl. ...................... 439/142; 312/223.2; 361/685
[58] Field of Search .................... 439/192; 361/683–686, 361/724, 727; 312/223.2, 223.1

[56] References Cited

U.S. PATENT DOCUMENTS

| | | | |
|---|---|---|---|
| 5,211,459 | 5/1993 | Wu | 361/685 |
| 5,265,951 | 11/1993 | Kumar | 312/223.2 |
| 5,559,672 | 9/1996 | Buras, Jr. et al. | 361/684 |
| 5,654,874 | 8/1997 | Suzuki | 361/685 |
| 5,663,867 | 9/1997 | Honda et al. | 361/684 |
| 5,738,537 | 4/1998 | Setoguchi et al. | 439/159 |

FOREIGN PATENT DOCUMENTS 7-225632  8/1995  Japan .
8-249087  9/1996  Japan .

*Primary Examiner*—Steven L. Stephan
*Assistant Examiner*—Hal Moon Hyeon
*Attorney, Agent, or Firm*—Finnegan, Henderson, Farabow, Garrett & Dunner, L.L.P.

[57] ABSTRACT

A card insertion hole is formed in a side wall of a base portion of an apparatus body. A card storage portion for storing a PC card is provided in the base portion. The card storage portion has a case to which a PC card is inserted, and an end opening portion of the case is opposed to the card insertion hole with a predetermined distance therebetween. A frame-like cover member is arranged between the opening portion and the card insertion hole, thereby covering the gap between the opening portion and the card insertion hole. A card insertion path for communicating the card insertion hole with the opening portion of the case is defined in the cover member. A lid member for opening/closing the cover insertion hole is provided at the cover member.

3 Claims, 3 Drawing Sheets

ELECTRONIC APPARATUS HAVING CARD STORAGE PORTION

BACKGROUND OF THE INVENTION

The present invention relates to an electronic apparatus such as a portable personal computer, a portable information terminal, or the like, and particularly to an electronic apparatus comprising a card storage portion to which a card-like electronic component for providing an expanded function can be loaded.

In recent years, there have been eager demands for a small portable personal computer of, for example, a book-type which has high performance, and such a personal computer is constructed so as to comprise a card storage portion into which a card-like electronic component for expanding a function of the computer can be loaded. The card storage portion for storing a PC card as a card-like electronic component, such as a modem card, an interface card, or the like, has a case of a rectangular cylindrical shape and a connector, which are mounted on a printed circuit board in the housing of computer. An end opening of the case is adjacent to and faces the connector, while the other end opening of the case defines a card insertion port and faces the card insertion slot formed in the housing of the computer.

In order that an end portion of a PC card loaded into the card storage portion can be picked up and drawn out by fingers, the card insertion port of the case is positioned to be recessed inwards from the card insertion slot of the housing. Therefore, there is a gap between the card insertion port of the case and the card insertion slot of the housing, and foreign substances may enter into the computer through the gap. As a countermeasure for preventing such foreign substances, a conventional personal computer adopts a method in which an insulating sheet is adhered on the inside of the housing to cover the gap between the card insertion port of the case and the insertion slot of the housing.

However, the personal computer as described above thus requires a assembling step of adhering an insulating sheet, so that the assembling yield is not excellent. When the adhering position of the insulating sheet is displaced, there is a problem that a gap remains and the outer appearance of the computer is injured.

BRIEF SUMMARY OF THE INVENTION

The present invention has been made in view of the above situation, and its object is to provide an electronic apparatus which is improved in the assembling yield and which is capable of preventing foreign substances from entering, without insuring the outer appearance.

In order to achieve the above object, an electronic apparatus according to the present invention comprises: an apparatus body having a wall portion in which a card insertion hole is formed; a case arranged in the apparatus body, having an opening portion opposed to the card insertion hole of the apparatus body with a predetermined gap therebetween, and defining a card storage portion for storing a card-like electronic component which is to be inserted through the card insertion hole; a connector provided in the apparatus body, so as to be connected with the card-like electronic component loaded into to the card storage portion; and a frame-like cover member provided in the apparatus body, covering the gap between the opening portion of the case and the card insertion hole of the apparatus body, and having a card insertion path for guiding the card-like electronic component inserted through the card insertion hole, to the opening portion of the case.

The electronic apparatus according to the present invention may further comprise a lid member provided on the cover member, for opening/closing the card insertion hole and the card insertion path.

Further, in the electronic apparatus according to the present invention, the cover member includes a rectangular first frame continued with the card insertion hole, and a rectangular second frame defining the card insertion path and opposing the opening portion of the case, and the first and second frames are integrally formed to be continuous to each other.

Another electronic apparatus according to the present invention comprises: an apparatus body having a wall portion in which a card insertion hole is formed; a case arranged in the apparatus body and having an opening portion opposed to the card insertion hole of the apparatus body with a predetermined gap therebetween, and a card storage portion for storing a card-like electronic component to be inserted through the card insertion hole; a connector provided in the apparatus body, so as to be connected with the card-like electronic component loading into the card storage portion; a frame-like cover member provided in the apparatus body and covering a gap between the opening portion of the case and the card insertion hole of the apparatus body, for guiding the card-like electronic component inserted through the card insertion hole, to the opening portion of the case; and an eject mechanism arranged in the case, for ejecting the car-like electronic component loaded to the card storage portion. The card insertion hole has a larger size than the opening portion of the case, and the cover member has a first opening portion communicating with the opening portion of the case and having a size substantially equal to the opening portion of the case, a second opening portion communicating with the card insertion hole and the first opening portion and having a size substantially equal to the card insertion hole, and an eject button for operating the eject mechanism so as to eject the car-like electronic component, the eject button provided in the second opening portion such that the eject button can be operated through the card insertion hole.

According to the electronic apparatus constructed as descried above, the cover member is provided between the card insertion hole formed in the wall portion of the apparatus body and the opening portion of the case, so that a gap between the insertion hole and the opening portion is covered the cover member, thereby preventing foreign substances from entering the apparatus body through the gap.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 5 show a personal computer according to an embodiment of the present invention, in which:

FIG. 1 is a perspective view showing the personal computer,

FIG. 2 is an exploded perspective view showing a base portion of the personal computer, and a printed circuit board, and a card storage portion, provided in the base portion, FIG. 3 is a perspective view showing a cover member of the card storage portion, FIG. 4 is a perspective view showing the base portion, the printed circuit board, and the card storage portion provided therein, and FIG. 5 is a cross-sectional view showing the card storage portion.

DETAILED DESCRIPTION OF THE INVENTION

In the following, explanation will be made of an embodiment in which the present invention is applied to a personal computer of a book type, with reference to the drawings.

Figure 1:
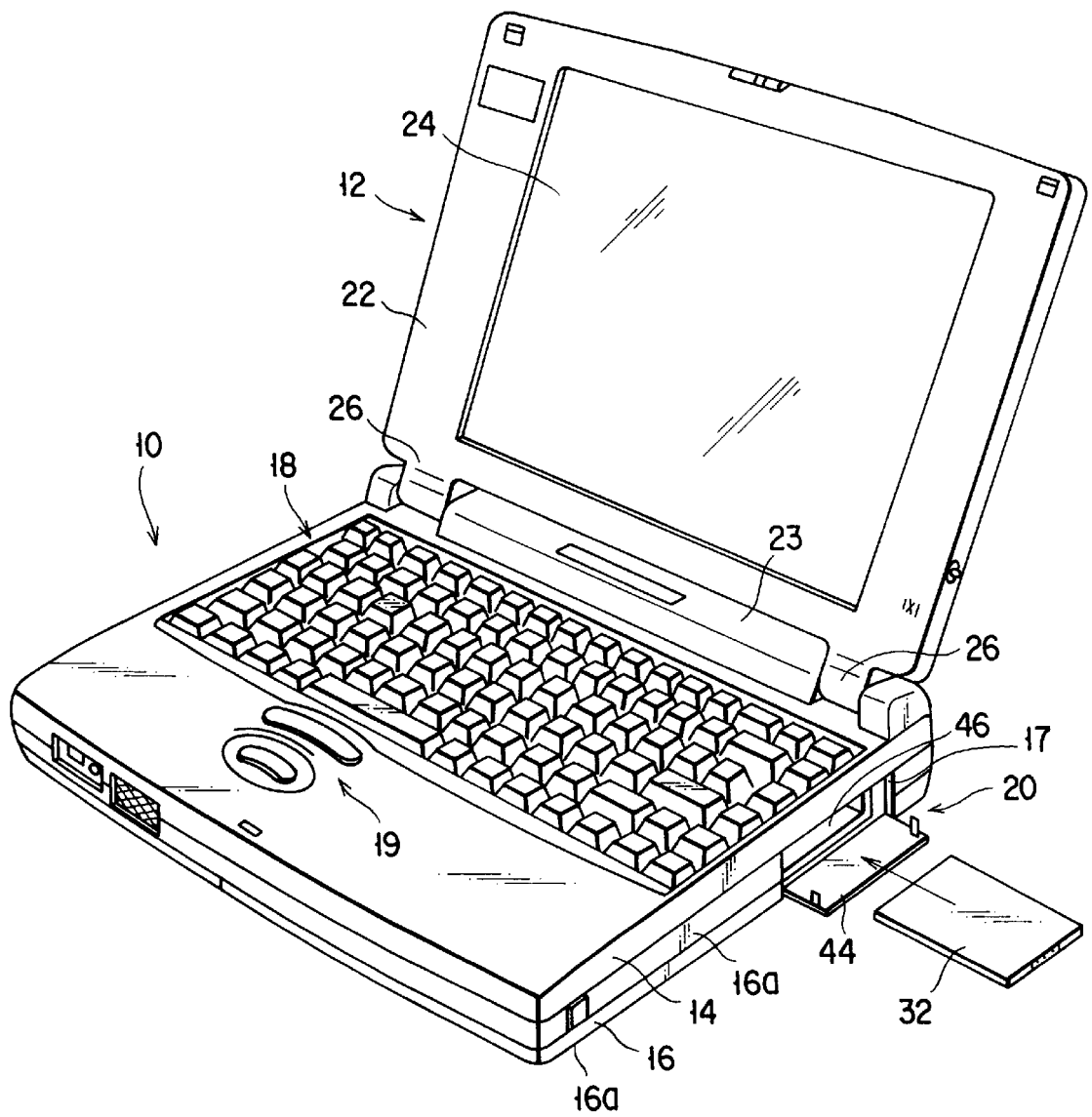

As shown in FIG. 1, a personal computer which functions as an electronic apparatus comprises an apparatus body 10 having a flat rectangular shape, and a display unit 12 supported on the apparatus body such that the unit 12 can be freely opened and closed.

The apparatus body 10 includes a rectangular base portion 16 with opened top, and a cover portion 14 fitted to the base portion so as to cover the top opening of the base portion. A keyboard 18, a click switch 19, and the like are provided on the upper surface of the apparatus body 10, and a plurality of convex portions 23 are provided at a rear end portion of the upper surface of the apparatus body 10.

The display unit 12 comprises a display housing 22 having a flat rectangular box-like body corresponding to the shape of the apparatus body 10, and a liquid crystal display panel 24 contained in the display housing. The display unit 12 has a pair of leg portions 26 projecting from a rear end portion of the display housing 22, and the leg portions 26 are supported on a convex portion 23 of the apparatus body 10 by hinges not shown.

In this manner, the display unit 12 is freely rotatable between a closed position where the unit 12 overlaps and covers the upper surface of the apparatus body 10 and an opened position where the unit 12 is rotated upwards and exposes the keyboard 18 and the liquid crystal display panel 24.

Figure 2:
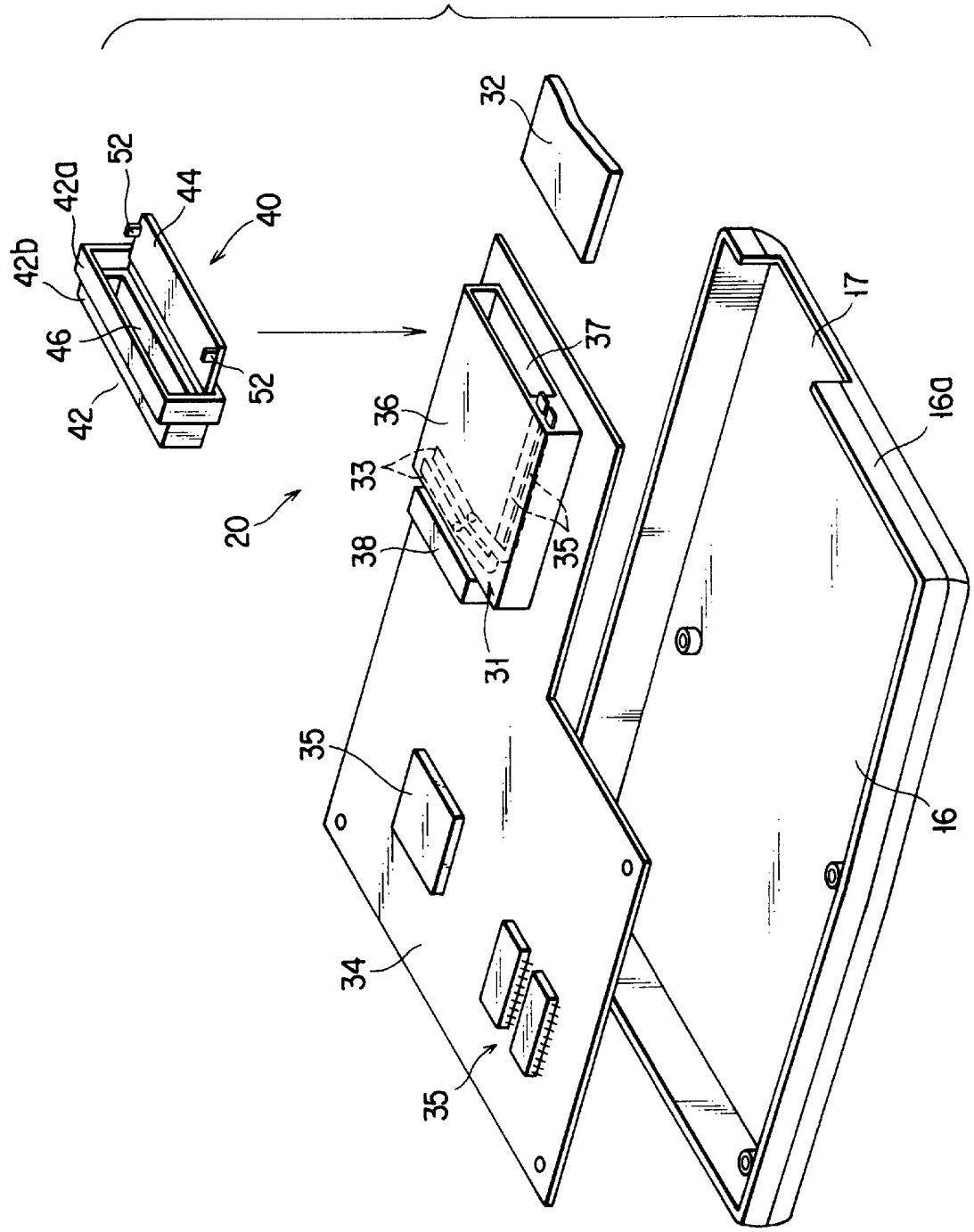
Figure 3:
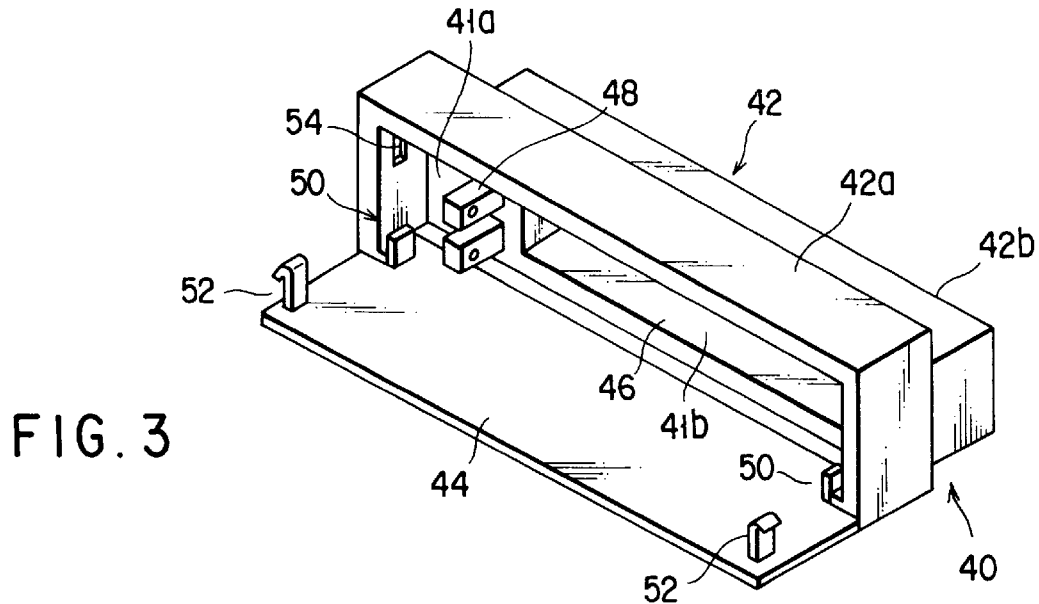
Figure 4:
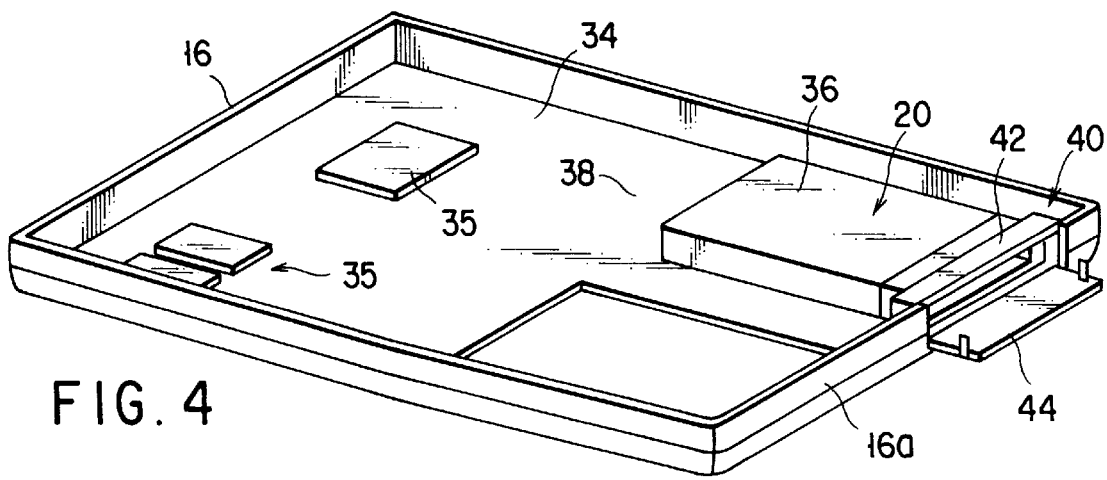

As shown in FIGS. 1 and 2, a printed circuit board 34, a card storage portion 20 for storing a PC card 32 as a card-like electronic component, a floppy disk drive not shown, a hard disk drive not shown, and the like are arranged in the apparatus body 10. A card insertion hole 17 having a rectangular shape and communicating with the card storage portion 20 is formed in a side wall 16a of the base portion 16 of the apparatus body 10.

The printed circuit board 34 is mounted on the bottom wall of base portion 16, and a number of electronic components 35 are mounted on the printed circuit board. The card storage portion 20 includes a case 36 having a rectangular cylindrical shape and a connector 38 which are fixed on the printed circuit board 34.

The case 36 is formed to have a size enough to store two PC cards, and has a first end opening portion 37 opposed to the card insertion hole 17 of the base portion 16, with a predetermined distance therebetween. The connector 38 is opposed and adjacent to a second end opening portion of the case 36. An eject mechanism 31 for ejecting a loaded PC card is provided at the case 36. The eject mechanism 31 comprises a pair of eject levers 33 provided rotatably in the vicinity of the second end opening portion of the case 36, and a pair of eject arms 35 extending from the eject levers, respectively, to the first opening portion 37, in the longitudinal direction of the case 36.

Figure 5:
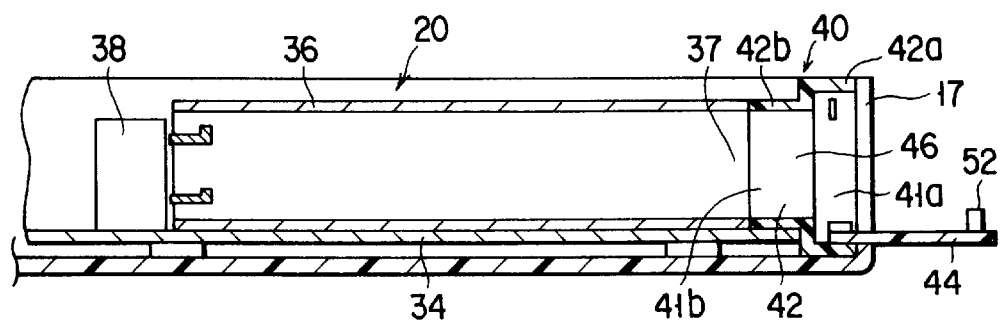

Further, the card storage portion 20 comprises a cover member 40 having a rectangular frame-like shape which is provided at a gap between the first opening portion 37 of the case 36 and the card insertion hole 17 to cover the gap. As shown in FIGS. 2 and 5, the cover member 40 has a cover body 42 and a lid member 44 attached to the cover body to be rotatable.

The cover body 42 is formed in a stepped rectangular cylindrical shape. Specifically, the cover body 42 includes a first frame 42a having a rectangular shape which defines a first opening portion 41a corresponding in size to the card insertion hole 17, and a second frame 42b having a rectangular shape which is smaller than the first frame and defines a second opening portion 41b corresponding in size to the first opening portion 37 of the case 36. The first and second frames 42a and 42b are integrally formed. An end of the first frame 42a is closed and the second frame 42b is formed to be continuous to the closed end of the first frame 42a. The second opening portion 41b is opened in the closed end of the first frame 42a, thereby communicating with the first opening portion 41a, and defines a card insertion path 46 communicating with the first opening portion 37 of the case 36.

A pair of card eject buttons 48 are provided at the closed end of the first frame 42a, such that the buttons are movable in a direction parallel to the longitudinal axis of the cover body 42. The card eject buttons 48 are engaged with the respective eject arms 37 provided on the case 36. When a card eject button 48 is pressed through the card insertion hole 17 and the first opening portion 41a, the eject mechanism 31 is operated so that a PC card can be ejected.

The cover body 42 is fixed to the base portion 16 itself or the printed circuit board 34, for example, by screws, a hook, or the like. In the fixed state, the first frame 42a is opposed and adjacent to the card insertion hole 17 with being in contact with the inner surface of the side wall 16a of the base portion 16, and the second frame 42b is opposed and adjacent to the end opening portion 37 of the case 36. An end of the card insertion path 46 communicates with the card insertion hole 17 through the first frame 42a, and the other end of the card insertion path 46 communicates with the inside of the case 36.

The lid member 44 has a rectangular shape corresponding in size to the card insertion hole 17, and provided on the first frame 42a to be rotatable between a closed position where the lid member closes the card insertion hole 17 and the opening of the first frame 42a and an opened position where the lid member opens the insertion hole 17 and the first frame. More specifically, both the lower end portions of the lid member 44 are mounted on the first frame 42a through a pair of hinges 50. Both the upper end portions of the lid member 44 are provided with a pair of engaging hooks 52 projecting toward the first frame 42a. A pair of concave portions 54 (one of which is shown) which can be engaged with the engaging hooks 52 are formed in the inner surface of the first frame 42a. Thus, when the lid member 44 is rotated to the closed position, the pair of engaging hooks 52 are engaged with the respective concave portions 54 of the first frame 42a so that the lid member 44 is locked at the closed position.

When a PC card 32 is loaded into the card storage portion 20 in the personal computer constructed as described above, at first, the lid member 44 is rotated to the opened position, to open the card insertion hole 17. Subsequently, the PC card 32 is inserted into the case 36 through the card insertion hole 17, the first frame 42a, and the card insertion path 46. Thereafter, the PC card 32 is pushed more deeply, to connect a connector not shown, provided at the top end of the PC card, with the connector 38 in the base portion 16. In this manner, the PC card 32 is loaded into the card storage portion 20 and is electrically connected to the personal computer.

To eject the PC card 32, a corresponding eject button 48 is pressed with the lid member 44 opened, and then, the corresponding eject lever 33 of the eject mechanism 31 is rotated through the eject arm 35, thereby pressing the PC card 32 toward the card insertion hole 17. As a result, the connection between the PC card 32 and the connector 38 is released, and the rear end portion of the PC card is pushed out from the card insertion hole 17. In this state, the rear end portion of the PC card 32 is picked up by fingers and drawn out of the card storage portion 20, so that the PC card 32 can be ejected.

According to a personal computer constructed as described above, the cover member 40 is fixed at a gap between the opening portion 37 of the case 36 and the card insertion hole 17 in the base portion 16, and the gap is completely covered by the cover member. Therefore, foreign substances can be securely prevented from entering into the apparatus body 10 through the gap, so that operation errors and damages on the personal computer caused by such foreign substances can be prevented.

Further, since the cover member 40 can be easily and precisely fixed to the base portion 16 or the printed circuit board 34 at a predetermined position, by screws, engaging hooks, or the like, the assembling feasibility can be improved, and positional displacements can be prevented to thereby improve the outer appearance.

The present invention is not limited to the embodiment as described above, but may be variously modified in practice. For example, the lid member 44 has been explained as being provided on the cover member 40, but may be installed at the base portion 16 of the apparatus body 10. In addition, the present invention is not limited to application to a portable personal computer, but is applicable to another electronic apparatus such as a word processor, a portable terminal, or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An electronic apparatus comprising:

an apparatus body having a wall portion in which a card insertion hole is formed;

a case arranged in the apparatus body, having an opening portion opposed to the card insertion hole of the apparatus body with a predetermined gap therebetween, and defining a card storage portion for storing a card-like electronic component to be inserted from the card insertion hole;

a connector provided in the apparatus body, to which the card-like electronic component loaded into the card storage portion is to be connected; and a cover member arranged in the apparatus body, covering the gap between the opening portion of the case and the card insertion hole of the apparatus body, and having a frame portion opposing the card insertion hole, a cover portion located between the frame portion and the case, and a lid member provided on the frame portion, for opening and closing the card insertion hole.

2. An electronic apparatus comprising:

an apparatus body having a wall portion in which a card insertion hole is formed;

a case provided in the apparatus body, having an opening portion opposed to the card insertion hole of the apparatus body with a predetermined gap therebetween, and defining a card storage portion for storing a card-like electronic component to be inserted from the card insertion hole;

a connector provided in the apparatus body, to which the card-like electronic component loaded into the card storage portion is to be connected;

a frame-like cover member provided in the apparatus body and covering the gap between the opening portion of the case and the card insertion hole of the apparatus body, for guiding the card-like electronic component inserted from the card insertion hole, to the opening portion of the case; and an eject mechanism provided at the case, for ejecting the card-like electronic component stored in the card storage portion;

wherein the card insertion hole has a larger size than that of the opening portion of the case, and the cover member has a first opening portion communicating with the card insertion hole and having a size substantially equal to that of the card insertion hole, a second opening portion communicating with the opening portion of the case and the first opening portion and having a size substantially equal to that of the opening portion of the case, and an eject button for operating the eject mechanism so as to eject the card-like electronic component, the eject button being provided in the second opening portion such that the eject button can be operated through the card insertion hole.

3. An electronic apparatus comprising:

an apparatus body having a wall portion in which a card insertion hole is formed;

a case arranged in the apparatus body, having an opening portion opposed to the card insertion hole of the apparatus body with a predetermined gap therebetween, and defining a card storage portion for storing a card-like electronic component to be inserted from the card insertion hole;

a connector provided in the apparatus body, to which the card-like electronic component loaded into the card storage portion is to be connected; and a cover member arranged in the apparatus body, covering the gap between the opening portion of the case and the card insertion hole of the apparatus body, and having a frame portion opposing the card insertion hole, a cover portion arranged on a bottom of the apparatus body and located between the frame portion and the case, and a lid member provided on the frame portion, for opening and closing the card insertion hole.

* * * * *